United States Patent
Lim et al.

(10) Patent No.: US 8,797,928 B2
(45) Date of Patent: Aug. 5, 2014

(54) METHODS AND SYSTEMS FOR USING A POWER SAVINGS MODE DURING VOICE OVER INTERNET PROTOCOL COMMUNICATION

(75) Inventors: Patrick Lim, Brossard (CA); Shan Qing, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 878 days.

(21) Appl. No.: 12/127,387

(22) Filed: May 27, 2008

(65) Prior Publication Data

US 2009/0296616 A1 Dec. 3, 2009

(51) Int. Cl.
G08C 17/00 (2006.01)
(52) U.S. Cl.
USPC .......................................... 370/311
(58) Field of Classification Search
USPC .......................................... 370/311, 473, 474
See application file for complete search history.

(56) References Cited

U.S. PATENT DOCUMENTS

| | | | |
|---|---|---|---|
| 7,801,066 B2 * | 9/2010 | Wang et al. | 370/311 |
| 2003/0086443 A1 | 5/2003 | Beach | |
| 2003/0152059 A1 | 8/2003 | Odman | |
| 2003/0227882 A1 | 12/2003 | Czaja et al. | |
| 2005/0245264 A1 * | 11/2005 | Laroia et al. | 455/445 |
| 2006/0072522 A1 * | 4/2006 | Chandra et al. | 370/338 |
| 2007/0072653 A1 | 3/2007 | Harris | |
| 2007/0230386 A1 | 10/2007 | Beach | |
| 2007/0298836 A1 * | 12/2007 | Yanover | 455/552.1 |
| 2008/0107056 A1 * | 5/2008 | Choi et al. | 370/311 |
| 2009/0010243 A1 * | 1/2009 | Hiddink | 370/346 |

FOREIGN PATENT DOCUMENTS

| | | |
|---|---|---|
| CN | 1685745 A | 10/2005 |
| JP | 09055764 | 2/1997 |
| WO | WO0106721 | 1/2001 |

OTHER PUBLICATIONS

International Search Report and Written Opinion—PCT/US2009/044705, International Search Authority—European Patent Office—Jan. 29, 2010.
Partial International Search Report—PCT/US2009/044705, International Search Authority—European Patent Office—Nov. 6, 2009.
Taiwan Search Report—TW098116899—TIPO—Jun. 20, 2012.

* cited by examiner

*Primary Examiner* — Mohammad Anwar
(74) *Attorney, Agent, or Firm* — Tyler J. Overall (57) ABSTRACT

Techniques presented herein allow a wireless device, (e.g., a mobile station, MS) to automatically enter a low power state when detecting silence based on monitored VoIP transmissions. Automatically entering the low power state may help the wireless device conserve power. In addition, for certain types of scheduling services in which bandwidth is allocated to the wireless device from within a system (e.g., Unsolicited Grant Service or extended real time polling service), automatically entering the low power state when silence is detected may also free up bandwidth (i.e., that would have otherwise been allocated to the wireless device entering the low power state) for allocation to other wireless devices in the system.

28 Claims, 7 Drawing Sheets

METHODS AND SYSTEMS FOR USING A POWER SAVINGS MODE DURING VOICE OVER INTERNET PROTOCOL COMMUNICATION

TECHNICAL FIELD

Certain embodiments of the present disclosure generally relate to wireless communication and, more particularly, to automatically entering a power savings state when certain situations are detected at a mobile station.

BACKGROUND

OFDM and OFDMA wireless communication systems under IEEE 802.16 use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station (BS) emits and receives radio frequency (RF) signals that convey data to and from the mobile stations (MS).

The RF signals between a BS and MS may be used to convey data, voice or video. For example, Voice over Internet Protocol (VoIP) is one application in which voice may be transmitted from a MS to a BS and over the internet To support a VoIP application, some systems use an Unsolicited Grant Service (UGS) or extended real time polling service (ertPS) to periodically allocate a bandwidth to the VoIP user. Although, as used herein, VoIP communication may also be via a wired connection.

In normal telephone conversations, generally only about 50% of the full duplex bandwidth is used at any given time. This is because one person is generally listening while the other is talking. When you couple this with the fact that there are natural pauses, pauses for breath and between words, the total required bandwidth for a conversation may be reduced an additional 10%. This means that there is between 50-60% of the available bandwidth that is not being used. Silence suppression techniques take advantage of this by detecting when there is a gap of silence during a conversation and suppressing transmissions during the silence. This silence suppression can improve system performance, as fewer packets sharing the media may result in more consistent delivery of the non-silent packets.

SUMMARY

Certain embodiments present methods for using a power savings mode in a wireless device, including one or any combination of: operating in accordance with a scheduling service; monitoring voice over Internet Protocol (VoIP) traffic to detect silence; automatically entering a power savings mode, in response to at least the detected silence; periodically re-monitoring the VoIP traffic to detect non-silence after entering the power savings mode; and automatically exiting the power savings mode, in response to at least the detected non-silence. In certain embodiments, the wireless device can communicate using frames in accordance with one or more standards of the Institute of Electrical and Electronics Engineers (IEEE) 802.16 family of standards and the power savings mode can be in accordance with the one or more standards of the IEEE 802.16 family of standards.

Certain embodiments present apparatuses configured to use a power savings mode, including one or any combination of: logic for operating in accordance with a scheduling service; logic for monitoring voice over Internet Protocol (VoIP) traffic to detect silence; logic for automatically entering a power savings mode, in response to at least the detected silence; logic for periodically re-monitoring the VoIP traffic to detect non-silence after entering the power savings mode; and logic for automatically exiting the power savings mode, in response to at least the detected non-silence. In certain embodiments, the apparatuses can include logic for communicating using frames in accordance with one or more standards of the Institute of Electrical and Electronics Engineers (IEEE) 802.16 family of standards and the power savings mode can be in accordance with the one or more standards of the IEEE 802.16 family of standards.

Certain embodiments present apparatuses for wireless communication configured to use a power savings mode, including one or any combination of: means for operating in accordance with a scheduling service; means for monitoring voice over Internet Protocol (VoIP) traffic to detect silence; means for automatically entering a power savings mode, in response to at least the detected silence; means for periodically re-monitoring the VoIP traffic to detect non-silence after entering the power savings mode; and means for automatically exiting the power savings mode, in response to at least the detected non-silence. In certain embodiments, the apparatuses can include means for communicating using frames in accordance with one or more standards of the Institute of Electrical and Electronics Engineers (IEEE) 802.16 family of standards and the power savings mode can be in accordance with the one or more standards of the IEEE 802.16 family of standards.

Certain embodiments present computer-program products for using a power savings mode in a wireless device comprising a computer readable medium having a set of instructions stored thereon, the set of instructions being executable by one or more processors and the set of instructions including one or any combination of: instructions for operating in accordance with a scheduling service; instructions for monitoring voice over Internet Protocol (VoIP) traffic to detect silence; instructions for automatically entering a power savings mode, in response to at least the detected silence; instructions for periodically re-monitoring the VoIP traffic to detect non-silence after entering the power savings mode; and instructions for automatically exiting the power savings mode, in response to at least the detected non-silence. In certain embodiments, the set of instructions can include instructions for communicating using frames in accordance with one or more standards of the Institute of Electrical and Electronics Engineers (IEEE) 802.16 family of standards and the power savings mode can be in accordance with the one or more standards of the IEEE 802.16 family of standards.

Certain embodiments present methods for using a power savings mode in a wireless device, including one or any combination of: operating in accordance with a scheduling service; establishing a connection for a voice over Internet Protocol (VoIP) call with a silence suppression mode enabled; in conjunction with establishing the connection, automatically entering a power savings mode; and maintaining the power savings mode until at least one condition selected from a set of predetermined conditions is met. In certain embodiments, the set of predetermined conditions can include an end of the VoIP call, receipt of a request for the wireless device to exit the power savings mode, and a determination that a quality of service (QoS) parameter for the VoIP call cannot be satisfied while in the power savings mode.

Certain embodiments present apparatuses configured to use a power savings mode, including one or any combination of: logic for operating in accordance with a scheduling service; logic for establishing a connection for a voice over Internet Protocol (VoIP) call with a silence suppression mode enabled; in conjunction with establishing the connection, logic for automatically entering a power savings mode; and logic for maintaining the power savings mode until at least one condition selected from a set of predetermined conditions is met. In certain embodiments, the set of predetermined conditions can include an end of the VoIP call, receipt of a request for the apparatus to exit the power savings mode, and a determination that a quality of service (QoS) parameter for the VoIP call cannot be satisfied while in the power savings mode.

Certain embodiments present apparatuses for wireless communication configured to use a power savings mode, including one or any combination of: means for operating in accordance with a scheduling service; means for establishing a connection for a voice over Internet Protocol (VoIP) call with a silence suppression mode enabled; in conjunction with establishing the connection, means for automatically entering a power savings mode; and means for maintaining the power savings mode until at least one condition selected from a set of predetermined conditions is met. In certain embodiments, the set of predetermined conditions can include an end of the VoIP call, receipt of a request for the apparatus to exit the power savings mode, and a determination that a quality of service (QoS) parameter for the VoIP call cannot be satisfied while in the power savings mode.

Certain embodiments present computer-program products for using a power savings mode in a wireless device comprising a computer readable medium having a set of instructions stored thereon, the set of instructions being executable by one or more processors and the set of instructions including one or any combination of: instructions for operating in accordance with a scheduling service; instructions for establishing a connection for a voice over Internet Protocol (VoIP) call with a silence suppression mode enabled; in conjunction with establishing the connection, instructions for automatically entering a power savings mode, and instructions for maintaining the power savings mode until at least one condition selected from a set of predetermined conditions is met. In certain embodiments, the set of predetermined conditions can include an end of the VoIP call, receipt of a request for the wireless device to exit the power savings mode, and a determination that a quality of service (QoS) parameter for the VoIP call cannot be satisfied while in the power savings mode.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Techniques presented herein allow a mobile station (MS) to automatically enter a low power state when detecting silence based on monitored VoIP transmissions. Automatically entering the low power state may help conserve power at the MS. In addition, for certain types of scheduling service in which bandwidth is automatically allocated to MSs in a system (e.g., Unsolicited Grant Service), automatically entering the low power state when silence is detected may also free up bandwidth (that would have been allocated to the MS entering the low power state) for allocation to other MSs.

Exemplary Wireless Communication System

The methods and apparatus of the present disclosure may be utilized in a broadband wireless communication system. As used herein, the term "broadband wireless" generally refers to technology that may provide any combination of wireless services, such as voice, Internet and/or data network access over a given area.

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

Mobile WiMAX is based on OFDM (orthogonal frequency-division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates and quality of service requirements.

The rapid growth in wireless internets and communications has led to an increasing demand for high data rate in the field of wireless communications services. OFDM/OFDMA systems are today regarded as one of the most promising research areas and as a key technology for the next generation of wireless communications. This is due to the fact that OFDM/OFDMA modulation schemes can provide many advantages such as modulation efficiency, spectrum efficiency, flexibility and strong multipath immunity over conventional single carrier modulation schemes.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

Figure 1:
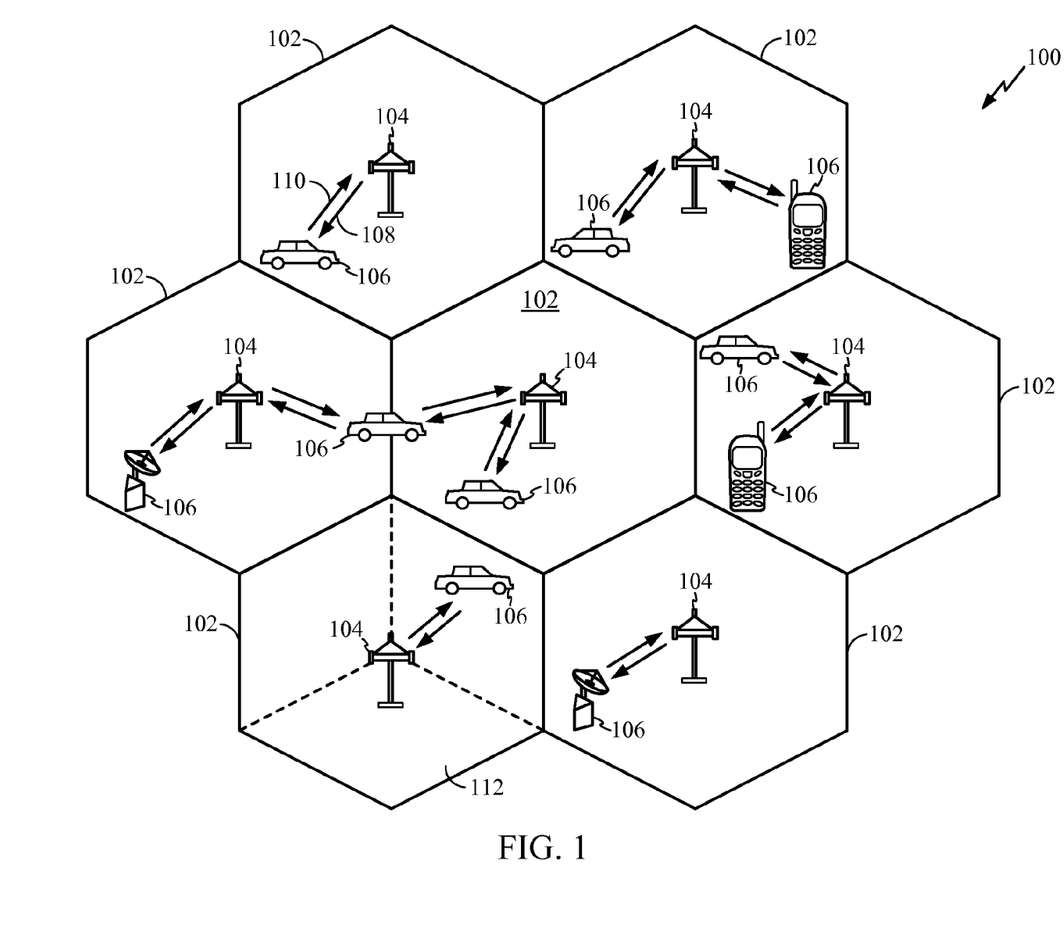
FIG. 1 illustrates an example wireless communication system, in accordance with certain embodiments of the present disclosure.

FIG. 1 illustrates an example of a wireless communication system 100 in which embodiments of the present invention may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
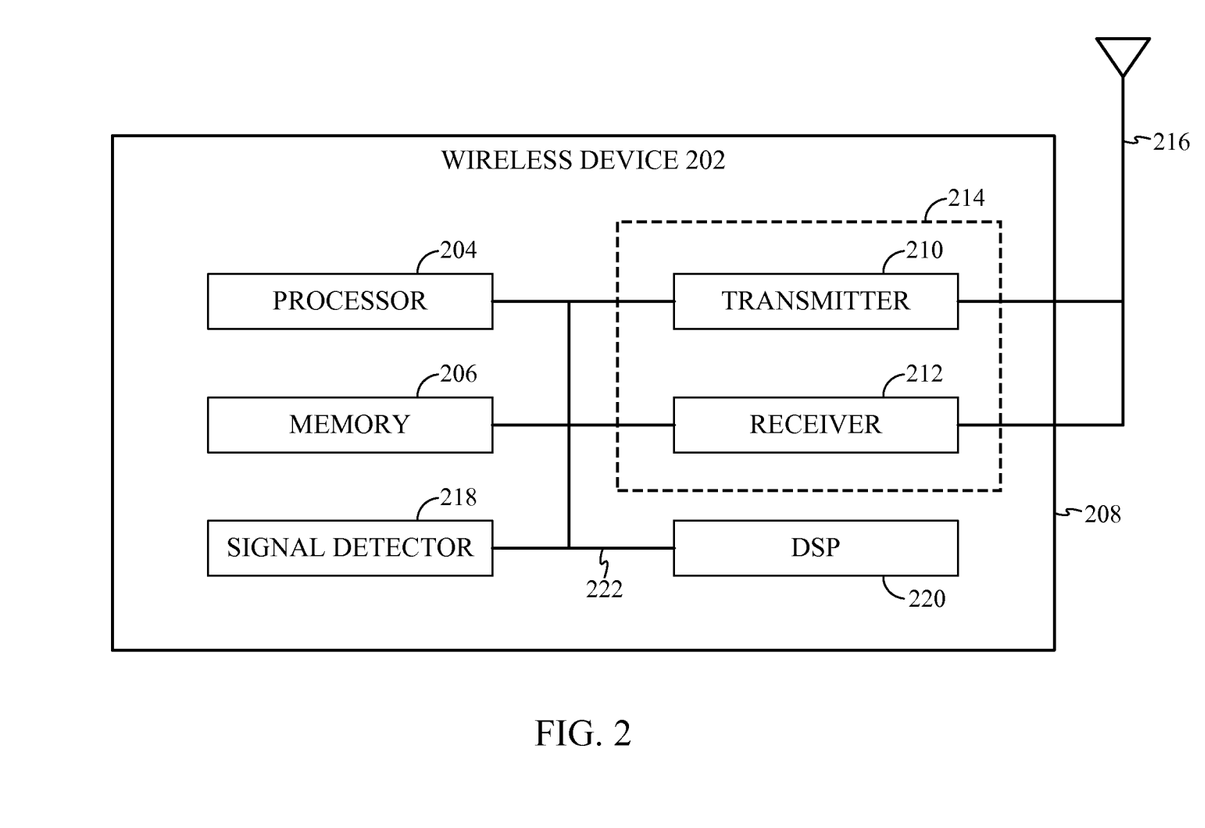
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
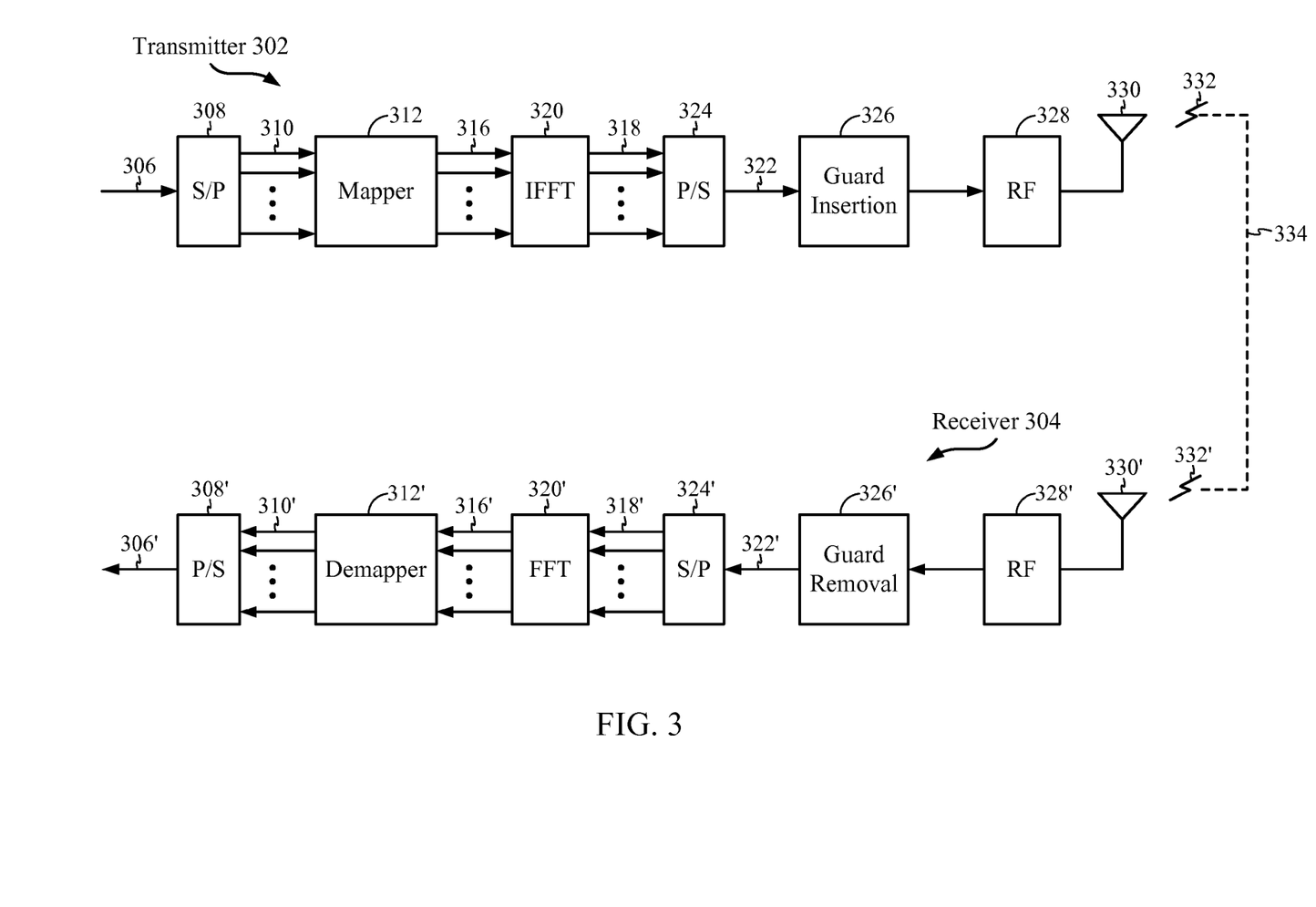
FIG. 3 illustrates an example transmitter and an example receiver that may be used within a wireless communication system in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found on a in a baseband processor 340'.

Automatically Activating a Power Savings Mode

As stated above, Voice over Internet Protocol (VoIP) is one application which may use WiMAX networks to transmit voice from a MS to a BS and then over the internet. To support a VoIP application, WiMAX may use an Unsolicited Grant Service (UGS) to allocate a fixed bandwidth to the VoIP user periodically. A previously noted, however, there is often a significant percentage of a VoIP conversation that corresponds to silence, at least on one end.

Techniques presented herein allow an MS to automatically enter a power savings mode when a period of silence is detected. For certain embodiments, automatically entering the power savings mode may be performed as an enhancement to silence suppression. In addition to saving power at the MS, in some situations, automatically entering a power savings mode as disclosed herein may also help improve overall system performance. For example, with the MS in the power savings mode, a BS may also be able to recover bandwidth that would have otherwise been allocated to the MS for allocation to other MSs in the system.

As power consumption is a concern in most mobile devices, several power saving specifications were described in the 802.16e standard. For example, a Power Saving Class Type II (PSC-II) is described in the 802.16e standard. In essence, the PSC-II mode allows a MS to enter a sleep window for a period of time and periodically wake-up to monitor for activity during a listening window. During the listening window the MS may determine if there is traffic to receive or transmit before returning to sleep again.

According to certain embodiments, a MS may automatically enter the PSC-II mode when a period of silence is detected. The MS may automatically exit the PSC-II mode (and return to Normal operation) upon the occurrence of any of a number of conditions. For example, the MS may exit the PSC-II mode when a VoIP call ends, upon receipt of a request from the BS for the MS to exit the PSC-II mode, or if the MS determines the QoS parameters of the VoIP call cannot be satisfied while PSC-II is activated. If the QoS parameters of the VoIP are still not satisfied after returning to Normal operation, then the MS may follow procedures outlined in the 802.16 standard to request additional bandwidth.

For certain embodiments, a MS may automatically enter the PSC-II a power savings mode when a VoIP connection is established that has a silence suppression feature enabled. Automatically activating PSC-II as soon as the VoIP call is engaged may reduce the overhead of requesting PSC-II activation every time a period of silence is detected. For such embodiments, as long as the MS is able to transmit and receive enough data packets to satisfy the QoS requirement for VoIP, the MS may remain in the PSC-II mode.

Figure 4:
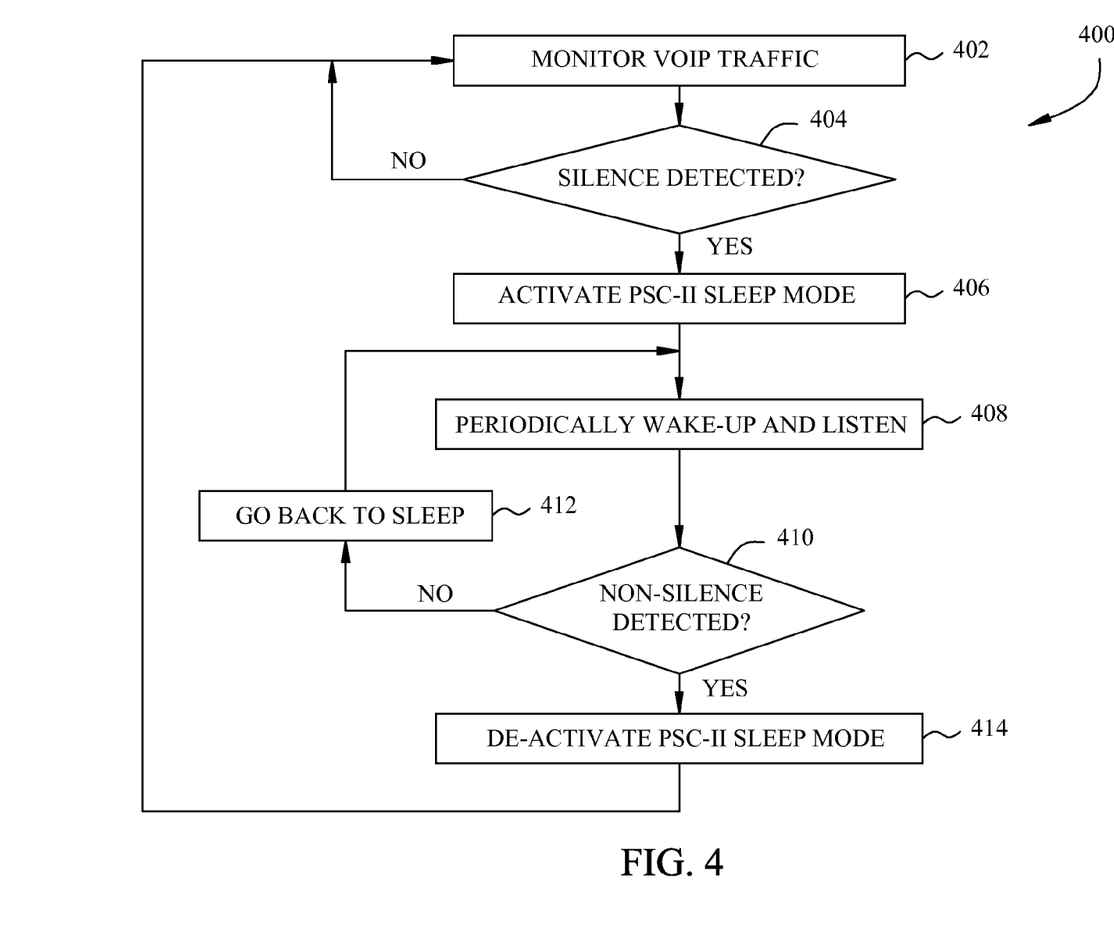
FIG. 4 illustrates example operations of a MS that may enter a sleep mode in response to detecting silence, in accordance with embodiments of the present disclosure.

FIG. 4 illustrates example operations 400 that an MS may perform in accordance with such embodiments. While the example operations involve a PSC-II as a specific example, those skilled in the art will recognize that similar techniques may be utilized to automatically activate different types of power savings modes. Further, while the operations describe activating a PSC-II mode in response to detecting silence, PSC-II mode may also be automatically activated when a VoIP connection is established with silence suppression enabled.

The operations 400 begin, at 402, by monitoring VoIP traffic. The MS determines at 404 whether or not there is a period of silence, for example, based on monitored outgoing VoIP traffic. The period of silence may correspond to one or more fixed time periods in which the MS is receiving voice traffic (e.g. the other party is talking) or natural pauses (e.g. pauses for breath and between words). If the MS does not detect silence, it may continue normal operations while monitoring VoIP traffic.

On the other hand, if silence is detected, the MS may automatically activate a PSC-II sleep mode, as illustrated at 406, and will remain asleep for a fixed period of time. As part of the activation process, the MS may send a sleep request to the BS and the MS may actually enter the PSC-II mode upon receiving a response from the BS. During this negotiation, various parameters, such as the size of the sleep window and listening window may be established. Since the BS is notified when a MS goes to sleep, the BS will not schedule any bandwidth allocation to the MS during the sleep window, even when the UGS data allocation mechanism requires so.

Periodically, the MS may wake up, at 408, and listen for a period of time. The listening may occur during a fixed listening window in between sleep windows, which may be fixed or vary (e.g., by growing exponentially). At 410, the MS will determine if non-silence was detected during the listening window. Non-silence may correspond, for example, to a resumption of participation in conversation by a user at the MS. Non-silence may also correspond to receipt of a signal from the BS indicating waiting data traffic, a signal from the BS containing the waiting data traffic, or some other type of signal. If the MS does not detect a non-silence event, or in other words, if the MS continues to detect silence, the MS may enter another sleep window, as illustrated at 412, and then repeat steps 408 and 410.

On the other hand, if the MS does detect non-silence, the MS may promptly de-activate the PSC-II sleep mode and resume normal operations. The MS may continue to monitor for silence and, again, automatically enter a power savings mode if silence is detected. The operations 400 shown in FIG. 4 may be performed by a MS when operating in a variety of quality of service (QoS) modes, such as a UGS or ertPS QoS modes. In the UGS case, automatically entering a power savings mode may improve system performance by freeing up bandwidth that would have been otherwise wastefully allocated to a MS suppressing transmissions after detecting silence.

Figure 5A:
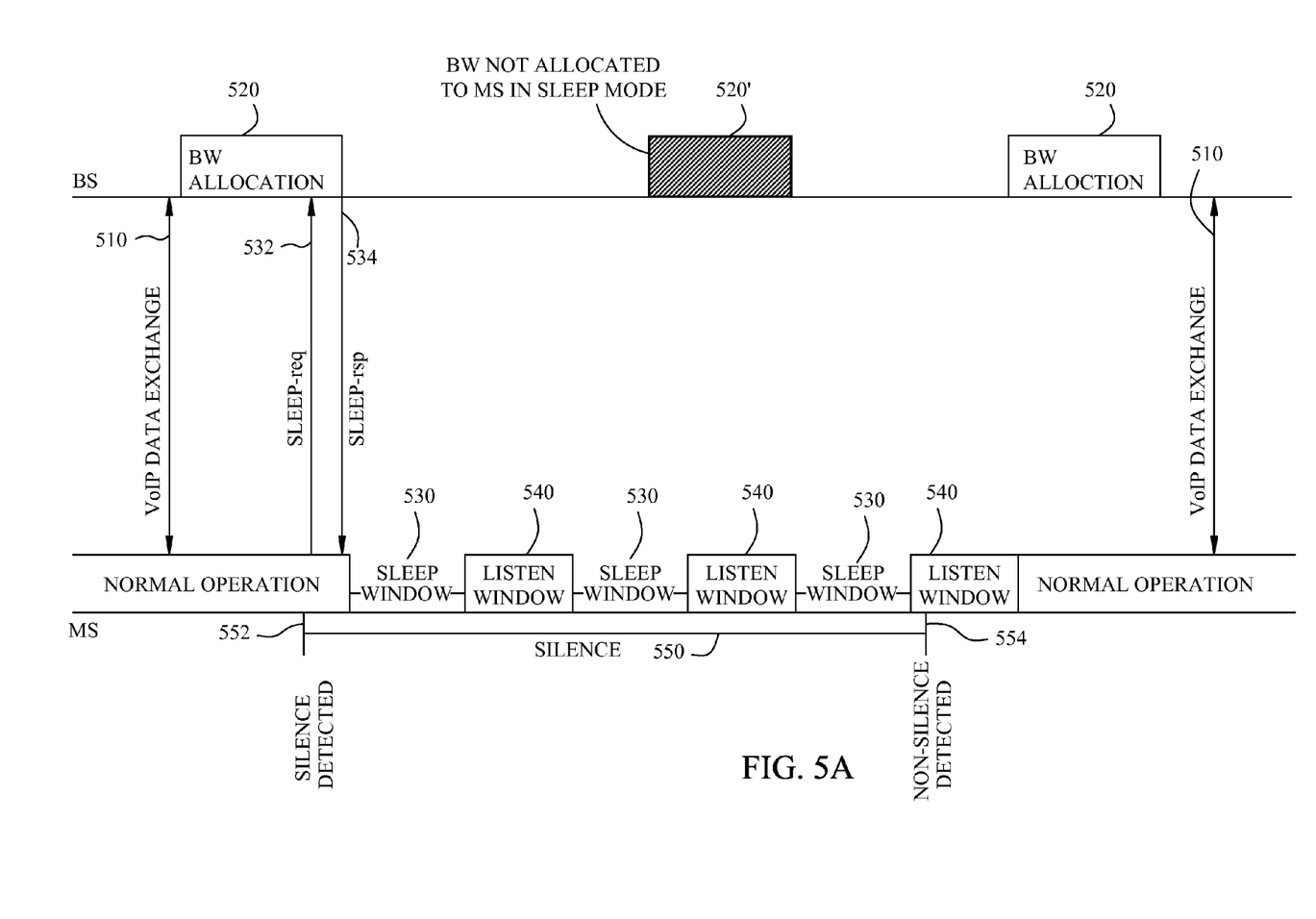
FIG. 5A illustrates example exchanges between a BS providing UGS quality of service and a MS, in accordance with embodiments of the present disclosure.

FIG. 5A illustrates an example exchange of transmissions that may occur between a BS providing a UGS quality of service (QoS) and a MS entering a PSC-II sleep mode after detecting a silence event, according to certain embodiments. In the illustrated example, normal operations are shown with VoIP exchanges 510 between the BS and the MS. Periodically, the BS may allocate bandwidth (BW) 520 among the various MSs it serves based on total available BW, service flow specific scheduling policies, service flow QoS parameters, connection air link quality, or any other criterion known by those skilled in the art.

At some point in time, the MS may detect silence, as indicated at 552. In response to the detection of silence, the MS may promptly transmit a Sleep_Request 532 to the BS. After receiving a Sleep_Response 534 from the BS acknowledging the request, the MS may enter the PSC-II sleep mode and power down certain components during a sleep window 530. After receiving the Sleep_Request 532 from the MS, the BS will not allocate any BW to the sleeping MS, even if the UGS data allocation mechanism might have otherwise required the BS to do so, given a VoIP connection. Thus, this bandwidth that would have otherwise been allocated to the sleeping MS may be allocated to other MSs in the system, as indicated at 520', which may help overall system performance.

At regular intervals the MS may wake up from sleep and enter a listening window 540 in which the MS monitors traffic to detect non-silence. If non-silence is not detected, the MS may continue to enter a sleep window 530 for the duration of the silence period 550. At some point in time, the MS may detect non-silence during a listening window. For example, the MS may detect outgoing traffic that indicates a mobile user has resumed speaking in a conversation after a period of silence. When non-silence is detected, at 554, during a subsequent listening window 540, the MS may promptly exit the PSC-II sleep mode and resume normal operations. During the next BS BW allocation period 520 the BS may allocate bandwidth to the MS, at which point the MS may resume VoIP data exchanges 510.

By employing methods in accordance with embodiments of the present invention, the MS may save power thus extending the time in which the MS may operate between charging cycles. Additionally, when utilized in a network offering UGS QoS, the MS may prevent the BS from unnecessarily allocating BW to it while the MS is in a sleep mode. At the same time, the use of a UGS BW allocation mechanism may significantly reduce the overhead of requesting BW, thereby allowing the system to support more VoIP users.

With extended real time polling service (ertPS), the BS allocates a fixed bandwidth to a MS periodically, much like with UGS. However, the MS can send bandwidth request to change the size of the allocation, while changing the allocation size in UGS via bandwidth requests is not allowed. The MS may request zero bandwidth to be allocated and, in response, the BS may cease to allocate bandwidth to the MS. When the MS requires bandwidth again, a contention bandwidth request may be sent to the BS (assuming no available bandwidth allocated to the MS) or, in the case of available bandwidth allocated to a different connection, a bandwidth request message/header, may be sent to the BS.

Figure 5B:
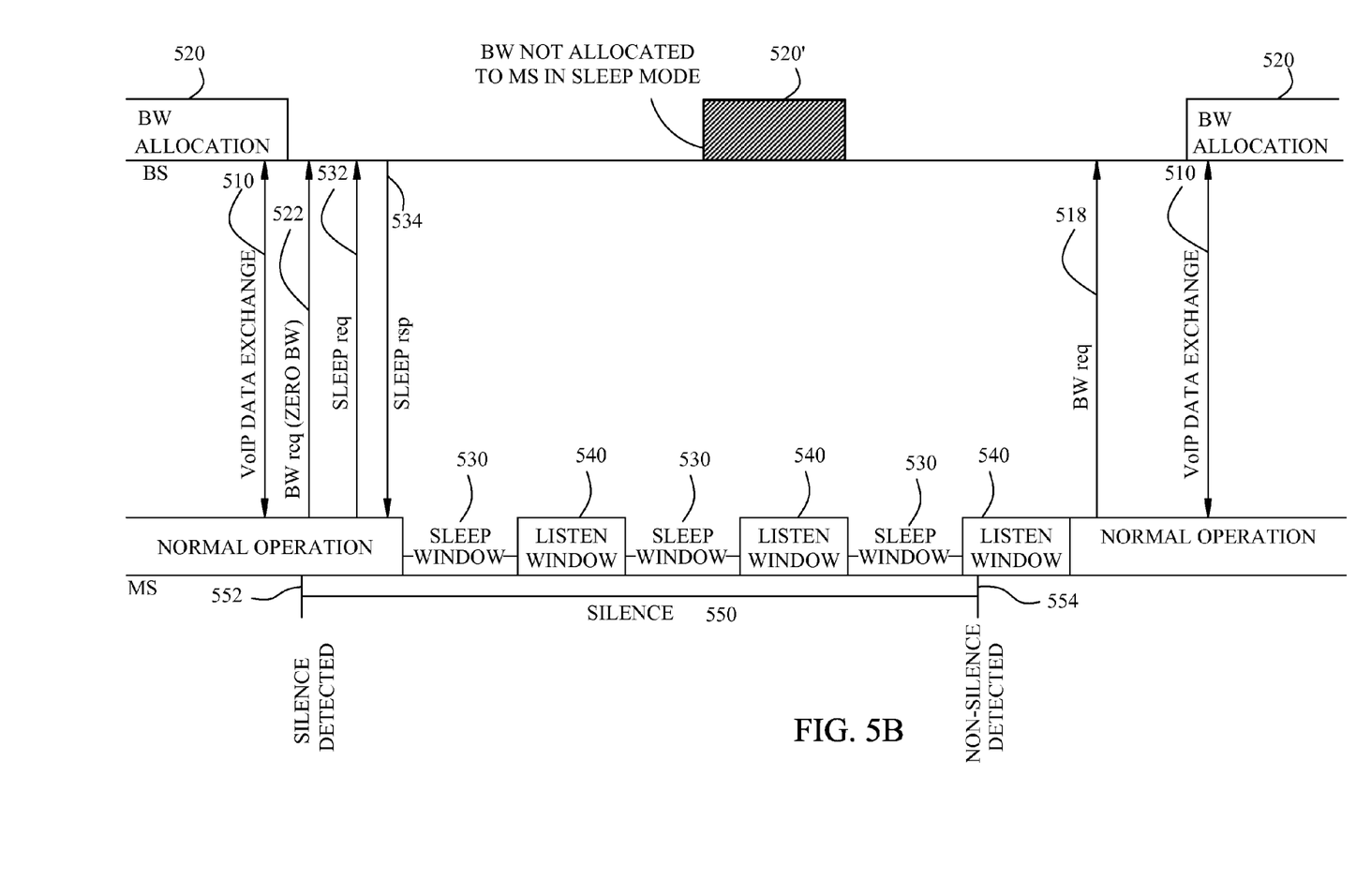
FIG. 5B illustrates example exchanges between a BS providing ertPS quality of service and a MS, in accordance with embodiments of the present disclosure.

FIG. 5B illustrates an example exchange of transmissions that may occur between a BS providing an ertPS QoS. In the illustrated example, the MS configured to automatically enter a PSC-II sleep mode after detecting silence, in accordance with certain embodiments. With the extended real time polling service (ertPS), the BS periodically allocates BW 520.

After being allocated BW, the MS and BS may exchange VoIP data 510. At some point in time, the MS may detect a silence event 552. As in the previous example, the MS may then send a sleep request 532 and receive an acknowledgement in the form of a response message 534. Prior to sending the sleep request, however, for certain embodiments, the MS may also send a zero bandwidth request 522 to the BS, which may free up the bandwidth that was allocated the MS. In response, the BS may cease to allocate bandwidth to the MS in subsequent BW allocations 520'.

As in the UGS example above, the MS may enter a sleep window 530, periodically waking-up and entering a listening window 540. After detecting non-silence at 554, the MS may promptly exit the PSC-II mode. At this time, the MS may require bandwidth again and may, thus, send bandwidth request 518 to modify the (zero) bandwidth allocation and request bandwidth (e.g., via a contention bandwidth request). In other words, if the MS chooses to reduce the bandwidth allocation to zero when silence is detected, the MS may need to send a contention bandwidth request to resume original bandwidth allocation after non-silence is detected.

While the description above refers to the possibility of the MS sending a zero bandwidth request when silence is detected, for certain embodiments, the MS may not send a zero bandwidth request but may choose to take some other action or inaction. For example, the MS may choose to leave the ertPS bandwidth allocation as is (in its current state when the silence is detected) without any change. In such a case, the MS does not have to send any type of bandwidth request in order to resume original allocation when non-silence is detected.

As another example, the MS may choose to reduce the bandwidth allocation to any non-zero allocation amount via a bandwidth request. In such a case, when non-silence is detected, the MS may send a bandwidth request with the reduced allocation in order to resume original allocation without a contention bandwidth request.

As previously described, for certain embodiments, PSC-II may be activated as a VoIP connection is established. In such embodiments, the MS may transmit and receives during non-silence periods. For ertPS, during silence periods, the MS may just ignore the bandwidth allocation, rather than requesting reduced bandwidth. When the MS transitions from silence period into non-silence period, PSC-II can still apply until one of the aforementioned conditions is met (e.g., the VoIP call ends, the BS requests the MS exit PSC-II, or the QoS parameters cannot be satisfied). In this situation, assuming no request to reduce bandwidth was sent, there is no need to send a bandwidth request again to increase allocated bandwidth.

Figure 4A:
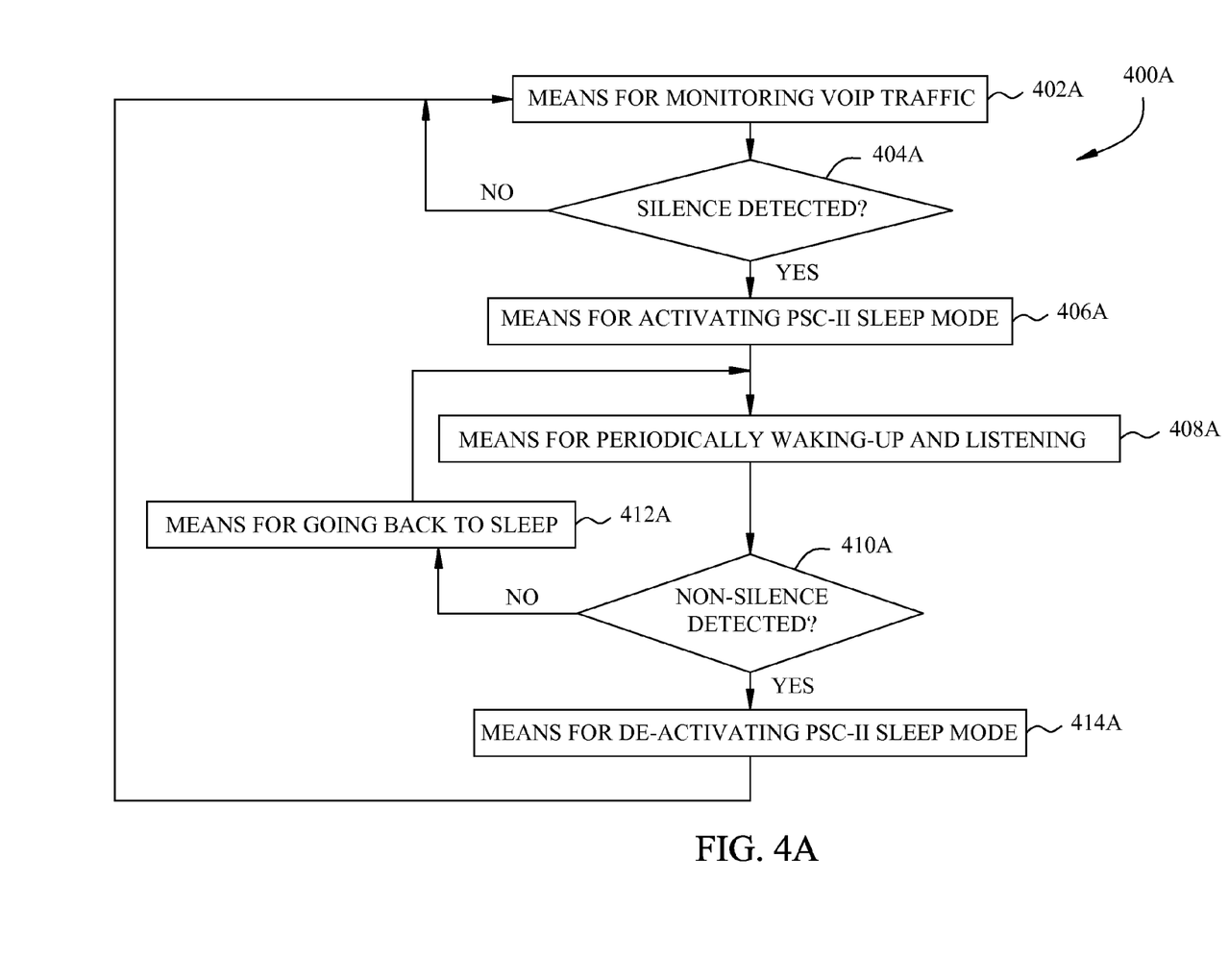
FIG. 4A is a block diagram of means corresponding to the example operations of FIG. 4.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 402-414 illustrated in FIG. 4 correspond to means-plus-function blocks 402A-414A illustrated in FIG. 4A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logic blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as instructions or one or more sets of instructions on a computer-readable medium or storage medium. A storage media may be any available media that can be accessed by a computer or one or more processing devices. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for using a power savings mode in a wireless device, comprising:
   operating in accordance with a scheduling service that includes an Extended Real Time Polling Service;
   receiving a first amount of allocated bandwidth at a first time period;
   establishing a connection for a voice over Internet Protocol (VoIP) call;
   monitoring VoIP traffic to detect silence;
   automatically entering a power savings mode, in response to at least the detected silence;
   sending a request, prior to entering the power savings mode, to reduce the first amount of allocated bandwidth scheduled to be allocated at a second time period while in the power savings mode and while maintaining the established connection for the VoIP call; and
   sending a request, after exiting the power savings mode, to resume allocating the first amount of bandwidth.

2. The method of claim 1, wherein:
   the scheduling service includes an Unsolicited Grant Service; and
   the wireless device is not allocated bandwidth while in the power savings mode.

3. The method of claim 2, further comprising:
   periodically re-monitoring the VoIP traffic to detect non-silence after entering the power savings mode; and
   automatically exiting the power savings mode, in response to at least the detected non-silence.

4. The method of claim 1, further comprising:
   periodically re-monitoring the VoIP traffic to detect non-silence after entering the power savings mode; and
   automatically exiting the power savings mode, in response to at least the detected non-silence.

5. The method of claim 1, further comprising sending a request to enter the power savings mode prior to automatically entering the power savings mode.

6. The method of claim 5, wherein the power savings mode includes a Power Saving Class Type II low power state.

7. The method of claim 1, wherein:
the wireless device communicates using frames in accordance with one or more standards of the Institute of Electrical and Electronics Engineers (IEEE) 802.16 family of standards; and
the power savings mode is in accordance with the one or more standards of the IEEE 802.16 family of standards.

8. An apparatus configured to use a power savings mode, comprising:
a processor;
memory in electronic communication with the processor, the memory storing executable instructions that when executed by the processor cause the processor to:
receive a first amount of allocated bandwidth at a first time period;
establish a connection for a voice over Internet Protocol (VoIP) call;
operate in accordance with a scheduling service that includes an Extended Real Time Polling Service;
monitor VoIP traffic to detect silence;
automatically enter a power savings mode, in response to at least the detected silence;
send a request, prior to entering the power savings mode, to reduce the first amount of allocated bandwidth scheduled to be allocated at a second time period while in the power savings mode and while maintaining the established connection for the VoIP call; and
send a request, after exiting the power savings mode, to resume allocating the first amount of bandwidth.

9. The apparatus of claim 8, wherein:
the scheduling service includes an Unsolicited Grant Service; and
the apparatus is not allocated bandwidth while in the power savings mode.

10. The apparatus of claim 9, wherein the processor is further configured to:
periodically re-monitor the VoIP traffic to detect non-silence after entering the power savings mode; and
automatically exit the power savings mode, in response to at least the detected non-silence.

11. The apparatus of claim 8, wherein the processor is further configured to:
periodically re-monitor the VoIP traffic to detect non-silence after entering the power savings mode; and
automatically exit the power savings mode, in response to at least the detected non-silence.

12. The apparatus of claim 8, wherein the processor is further configured to send a request to enter the power savings mode prior to automatically entering the power savings mode.

13. The apparatus of claim 12, wherein the power savings mode includes a Power Saving Class Type II low power state.

14. The apparatus of claim 8, wherein:
the processor is further configured to communicate using frames in accordance with one or more standards of the Institute of Electrical and Electronics Engineers (IEEE) 802.16 family of standards; and
the power savings mode is in accordance with the one or more standards of the IEEE 802.16 family of standards.

15. An apparatus for wireless communication configured to use a power savings mode, comprising:
means for operating in accordance with a scheduling service that includes an Extended Real Time Polling Service;
means for receiving a first amount of allocated bandwidth at a first time period;
means for establishing a connection for a voice over Internet Protocol (VoIP) call;
means for monitoring VoIP traffic to detect silence;
means for automatically entering a power savings mode, in response to at least the detected silence;
sending a request, prior to entering the power savings mode, to reduce the first amount of allocated bandwidth scheduled to be allocated at a second time period while in the power savings mode and while maintaining the established connection for the VoIP call; and
means for sending a request, after exiting the power savings mode, to resume allocating the first amount of bandwidth.

16. The apparatus of claim 15, wherein:
the scheduling service includes an Unsolicited Grant Service; and
the apparatus is not allocated bandwidth while in the power savings mode.

17. The apparatus of claim 16, further comprising:
means for periodically re-monitoring the VoIP traffic to detect non-silence after entering the power savings mode; and
means for automatically exiting the power savings mode, in response to at least the detected non-silence.

18. The apparatus of claim 15, further comprising:
means for periodically re-monitoring the VoIP traffic to detect non-silence after entering the power savings mode; and
means for automatically exiting the power savings mode, in response to at least the detected non-silence.

19. The apparatus of claim 15, further comprising means for sending a request to enter the power savings mode prior to automatically entering the power savings mode.

20. The apparatus of claim 19, wherein the power savings mode includes a Power Saving Class Type II low power state.

21. The apparatus of claim 15, wherein:
the apparatus includes means for communicating using frames in accordance with one or more standards of the Institute of Electrical and Electronics Engineers (IEEE) 802.16 family of standards; and
the power savings mode is in accordance with the one or more standards of the IEEE 802.16 family of standards.

22. A computer-program product for using a power savings mode in a wireless device comprising a non-transitory computer readable medium having a set of instructions stored thereon that when executed by a processor, cause the processor to:
operate in accordance with a scheduling service that includes an Extended Real Time Polling Service;
receive a first amount of allocated bandwidth at a first time period;
establish a connection for a voice over Internet Protocol (VoIP) call;
monitor VoIP voice over Internet Protocol (VoIP) traffic to detect silence; and
automatically enter a power savings mode, in response to at least the detected silence;
send a request, prior to entering the power savings mode, to reduce the first amount of allocated bandwidth while in the power savings mode and while maintaining the established connection for the VoIP call; and send a request, after exiting the power savings mode, to resume allocating the first amount of bandwidth.

23. The computer-program product of claim 22, wherein:
the scheduling service includes an Unsolicited Grant Service; and
the wireless device is not allocated bandwidth while in the power savings mode.

24. The computer-program product of claim 23, wherein when executed, the set of instructions further cause the processor to:
periodically re-monitor the VoIP traffic to detect non-silence after entering the power savings mode; and
automatically exit the power savings mode, in response to at least the detected non-silence.

25. The computer-program product of claim 22, wherein when executed, the set of instructions further cause the processor to:
periodically re-monitor the VoIP traffic to detect non-silence after entering the power savings mode; and
automatically exit the power savings mode, in response to at least the detected non-silence.

26. The computer-program product of claim 22, wherein when executed, the set of instructions further cause the processor to send a request to enter the power savings mode prior to automatically entering the power savings mode.

27. The computer-program product of claim 26, wherein the power savings mode includes a Power Saving Class Type II low power state.

28. The computer-program product of claim 22, wherein when executed the set of instructions further cause the processor to communicate using frames in accordance with one or more standards of the Institute of Electrical and Electronics Engineers (IEEE) 802.16 family of standards; and
the power savings mode is in accordance with the one or more standards of the IEEE 802.16 family of standards.

* * * * *